G. C. GRANTIER.
DRIP PAN FOR GAUGE COCKS.
APPLICATION FILED OCT. 8, 1920.
1,404,602.
Patented Jan. 24, 1922.
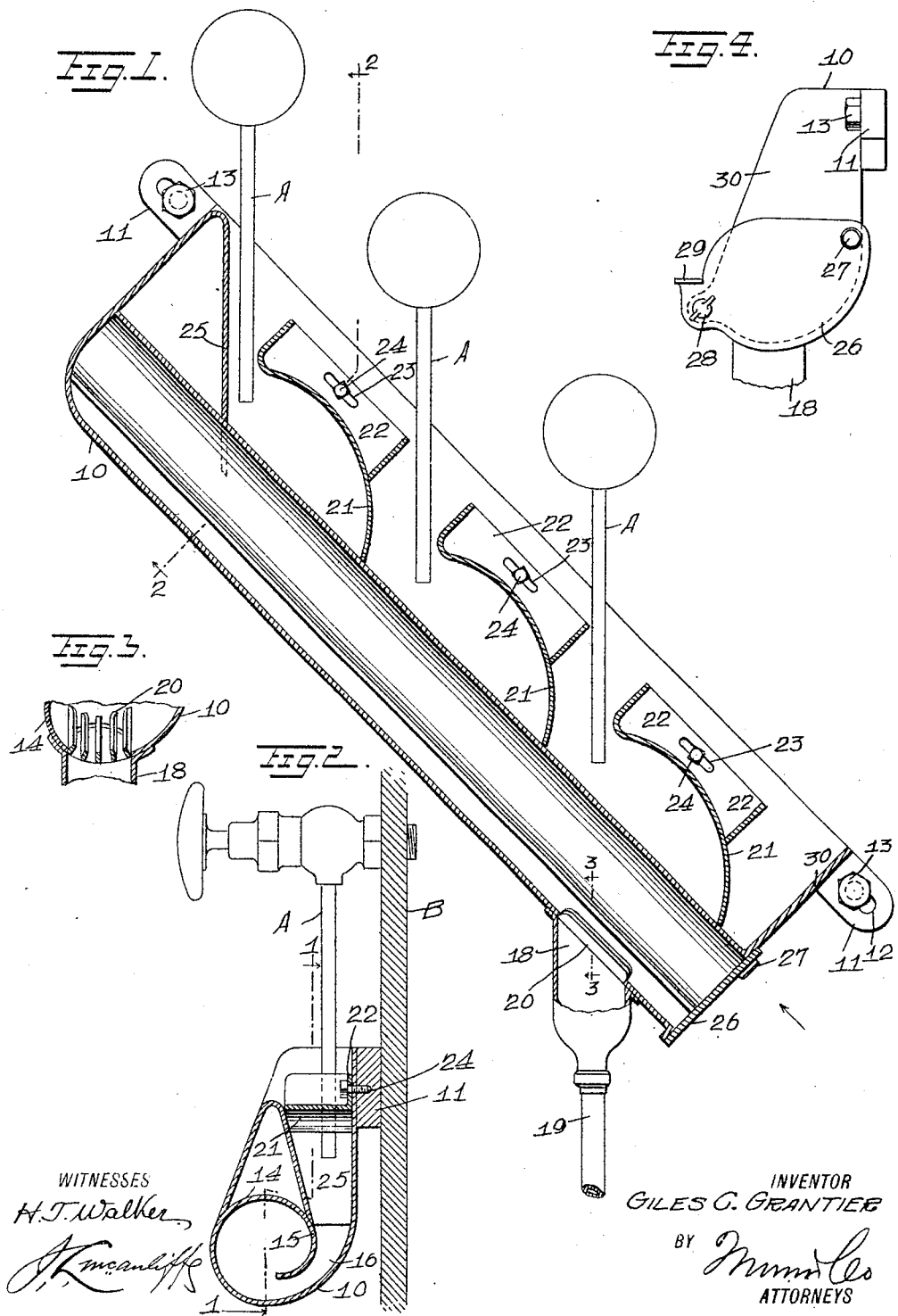

UNITED STATES PATENT OFFICE.

GILES CHITTENDEN GRANTIER, OF HORNELL, NEW YORK.

DRIP PAN FOR GAUGE COCKS.

1,404,602. Specification of Letters Patent. Patented Jan. 24, 1922.

Application filed October 8, 1920. Serial No. 415,574.

*To all whom it may concern:*

Be it known that I, GILES C. GRANTIER, a citizen of the United States, and a resident of Hornell, in the county of Steuben and State of New York, have invented a new and Improved Drip Pan for Gauge Cocks, of which the following is a description.

My invention relates to a drip pan or "drip" as it is usually termed by engine-men, which is provided on boilers beneath the gauge cocks.

One of the objects of the invention is to minimize the liability of the clogging of the pan by freezing or otherwise. When the usual pan is clogged by freezing or otherwise, the sound of steam escaping into the pan from a gauge cock is not dissimilar to the sound produced when water is drawn from the gauge cock into an unclogged pan; and therefore, the engine-man is unable by the sound as ordinarily relied upon to get a correct "reading" or indication of the water conditions in the boiler.

Also, the opening of the gauge cock when the ordinary pan is employed frequently results in a spattering of water, and the steam rises and disseminates itself throughout the cab so that moisture accumulates on the windows, thereby obscuring the vision, the trouble being aggravated in cold weather by the moisture freezing on the windows. Incidentally, the water is sprayed over the engine-men much to their discomfort. It is an object of my invention to provide a pan that will overcome the objections referred to.

It is a further object of my invention to provide a drip pan of the indicated class so constructed that with water or steam directed into the same from the cock there may be produced a characteristic sound so that the value of the sound as an indicating means is enhanced.

The above and other objects are attained by my invention, a specific description of an example of a practical embodiment of which is hereinafter given.

Figure 1 is a longitudinal vertical section of my improved pan as indicated by the irregular line 1—1 in Figure 2;

Figure 2 is a transverse vertical section as indicated by the line 2—2, Figure 1;

Figure 3 is a detail in vertical section on the line 3—3, Figure 1.

Figure 4 is an end view looking in the direction of the arrow at the right of Figure 1;

I have conventionally indicated at A three gauge cocks assumed to be on a boiler, part of which is shown in Figure 2 and designated by the letter B. The pan body 10 is provided with suitable means to secure it to the boiler, there being shown a strip 11 on the pan at the back near the top and extending beyond the same, the extending ends being shown with slots 12 adapted to receive fastener screws or bolts 13. The body of the pan 10 has a length to extend beneath the several gauge cocks A and in practice the pan is disposed in inclined position for cocks discharging at different heights or disposed horizontally when the cocks are at the same level.

The bottom of the pan 10 at the front edge thereof is curved over in spiral form as at 14 to produce a longitudinal space for trapping the water, steam or moisture directed into the pan from the gauge cocks. The throat 16 running longitudinally of the pan leads on curved lines laterally outward from the back of the pan into the trap space 15. The general trap form of the pan is efficient to a high degree in trapping and preventing the rising of water and steam from the pan and the water and steam is furthermore given a swhirling movement and retardation by following the spiral wall 14. In addition sound will be more or less muffled and the proportions of the trap space and throat leading thereto as well as the adjacent form of the pan can be made so that the impact of the steam or moisture will produce a characteristic sound.

The throat 16 narrows toward the space 15 and the front of said throat may be produced by a hollow V-shaped member running along the pan at the top of the spirally curved portion 14. A discharge 18 leads downwardly from the pan adjacent its lower end and is contracted for coupling a drain pipe 19, leading to any desired point. Screen bars 20 may as shown be provided in the pan at the discharge 18 to exclude matter that would clog the pipe 19.

To unfailingly prevent water, etc., from rebounding from the pan into the cab I provide deflecting means which in the preferred form as illustrated, consist of separate deflectors 21 presenting curved surfaces toward the bottom of the pan, said deflectors being positioned adjacent to the respective gauge cocks A. Each deflector 21 is separately adjustable longitudinally of the pan in order to suit the different positions of gauges on various boilers. In the illustrated example a back member 22 on each deflector is provided with a slot 23 through which a screw or tap bolt 24 extends into the back strip 11. It will be readily understood that water, etc., escaping from a gauge A and rebounding from the bottom of the pan will strike the adjacent deflector 21 and thereby the spraying of the cab or engine men and the dissemination of moisture throughout the cab will be prevented or minimized. Also, the deflectors (21, 22) serve to an appreciable extent to exclude foreign substances from the drip pan.

In the pan at the upper end I prefer to provide an inclined splash plate 25. Also, at the lower end the pan is provided with a swingable closure 26 to afford a clean-out, said closure being pivoted adjacent to the back of the pan near the top as at 27, any suitable fastener 28 being provided to secure the swingable closure 26 in the closed position. Also, the enclosure may have a suitable fingerhold at the front thereof as at 29, which may consist of a small flange at about right angles to the plane of the closure. Above the swingable closure 26 the pan may be permanently closed as at 30.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims. Thus, for example, the inclination of the pan, the angle of the drain pipe, and the angular position and curvature of the deflectors and similar details will vary with the type of locomotive as will readily be understood.

Having thus described my invention, I claim:

1. A drip pan of the class described having a deflecting means above the bottom thereof to deflect water, moisture, or steam, rebounding from the pan.

2. A drip pan of the class described having a deflecting means above the bottom thereof to deflect water, moisture, or steam rebounding from the pan, said deflecting means being adjustable on the pan to variously position the same to conform to the positions of gauge cocks.

3. A drip pan adapted to be positioned on a boiler beneath the gauge cocks, and a plurality of deflectors on said pan for deflecting moisture or steam rebounding from the pan.

4. A drip pan adapted to be positioned on a boiler beneath the gauge cocks, and a plurality of deflectors on said pan for deflecting moisture or steam rebounding from the pan, said deflectors being separately adjustable on the pan.

5. A drip pan of the class described having deflectors disposed above the bottom of the pan and presenting concave surfaces toward the pan bottom.

6. A drip pan of the class described having thereon a hollow portion into which water or steam received by the pan may enter, there being a lateral throat along the side of the pan body and leading to said hollow portion for directing water, steam, or moisture thereto.

7. A drip pan of the class described having means thereon to trap or retard steam or water received by the pan and presenting a lateral throat at a side of the pan body and leading to said means for directing steam, water, or moisture thereto.

8. A drip pan of the class described, having an edge thereof in spiral form to present a trap space longitudinally of the pan, there being a throat leading to said space to direct water, steam, or moisture thereto.

9. A drip pan of the class described having an edge thereof in spiral form to present a trap space longitudinally of the pan, there being a throat leading to said space to direct water, steam, or moisture thereto, said throat narrowing toward said space.

10. A drip pan of the class described having a curved wall presenting a trap space in which water, steam, or moisture are given a whirling motion, there being a throat leading to said space for directing the water, steam or moisture thereinto.

11. As a new article of manufacture, a drip pan for gauge cocks having an area adapted to receive fluids from the gauge cocks, and a vapor trap chamber ranging longitudinally of the pan, said trap chamber having an entrance near the bottom thereof for vapor to rise and to be trapped in the chamber.

12. A drip pan of the class described having a curved wall presenting a trap space in which water, steam, or moisture will be given a whirling motion, there being a throat leading to said space for directing water, steam or moisture thereinto; together with means for mounting said pan in inclined position, and a discharge leading from said space adjacent to the lower end of the pan.

GILES CHITTENDEN GRANTIER.